United States Patent
Sörvik

(12) 
(10) Patent No.: US 6,341,632 B1
(45) Date of Patent: Jan. 29, 2002

(54) METHOD FOR TIMBER HARVESTING AND SYSTEM FOR FORESTRY

(76) Inventor: Bengt Sörvik, Årby Gård, Rasbokil, Uppsala SE-755 95 (SE)

( * ) Notice: Subject to any disclaimer, the term of this patent is extended or adjusted under 35 U.S.C. 154(b) by 0 days.

(21) Appl. No.: 09/529,974

(22) PCT Filed: Apr. 28, 1998

(86) PCT No.: PCT/SE98/00788

§ 371 Date: Dec. 20, 2000

§ 102(e) Date: Dec. 20, 2000

(87) PCT Pub. No.: WO99/23873

PCT Pub. Date: May 20, 1999

(30) Foreign Application Priority Data

Oct. 23, 1997 (WO) .............................. PCT/SE97/01782

(51) Int. Cl.$^7$ .......................... A01G 23/08; B27B 1/00; B23Q 15/00
(52) U.S. Cl. .................... 144/335; 144/3.1; 144/4.1; 144/34.1; 144/336; 144/357; 144/367; 144/382
(58) Field of Search .................. 144/4.1, 4.8, 34.1, 144/335, 336, 337, 356, 357, 382, 364, 384, 3.1, 367; 250/223.12, 559.25; 336/394, 384

(56) References Cited

U.S. PATENT DOCUMENTS 6,182,725 B1 * 2/2001 Sörvik ........................ 144/335

FOREIGN PATENT DOCUMENTS

| DE | 0 535 919 | 4/1993 |
| DE | 41 34 790 | 4/1993 |
| DE | 43 32 412 | 3/1994 |
| DE | 296 07 860 | 10/1996 |

* cited by examiner

Primary Examiner—W Donald Bray
(74) Attorney, Agent, or Firm—Browdy and Neimark

(57) ABSTRACT

A method and a system for forestry, in particular harvesting by means of a harvesting machine comprising a vehicle and a harvesting arrangement mounted thereon, is based on the fact that at least one position determining device (5), capable of determining the positioning of the harvesting machine by means of external wirelessly receivable signals, is arranged on the harvesting machine (1). A marking device adapted to apply a marking on pieces of timber obtained from trees is arranged on the harvesting machine. A control unit (8), suitably a computer, is arranged on the harvesting machine to control the marking device to mark the piece of timber with position information or a code corresponding thereto by means of position information received from the position determining device (5).

48 Claims, 8 Drawing Sheets

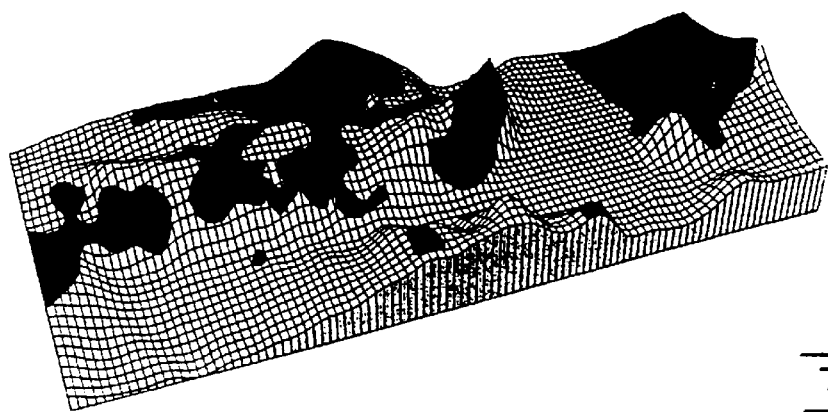
Fig 1
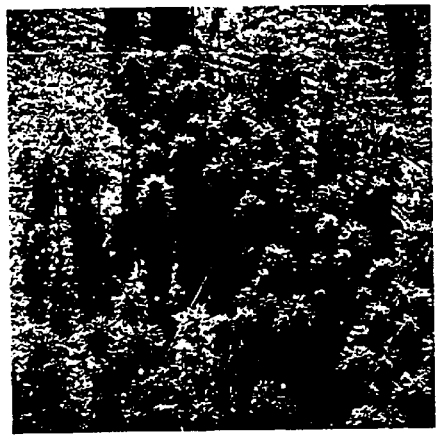
a
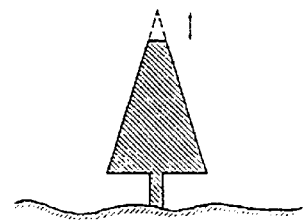
b
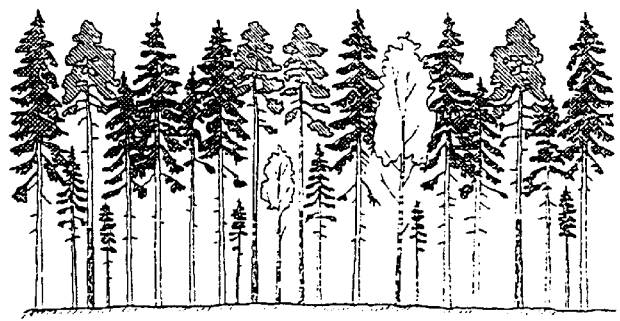
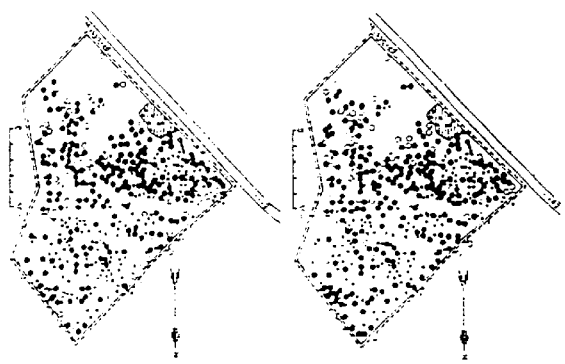
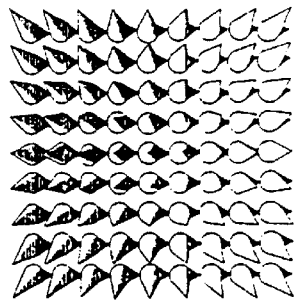
c
Fig 2

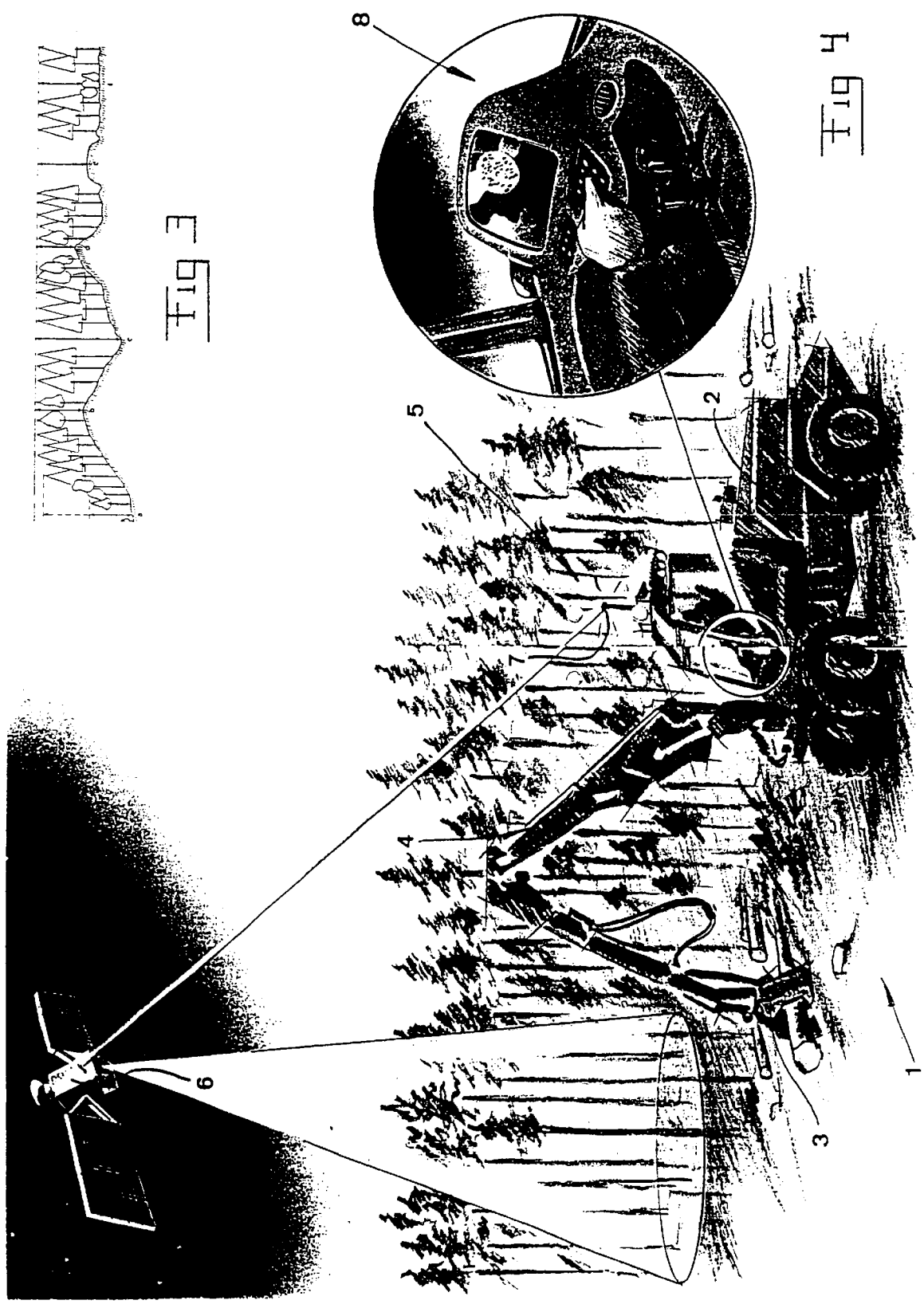

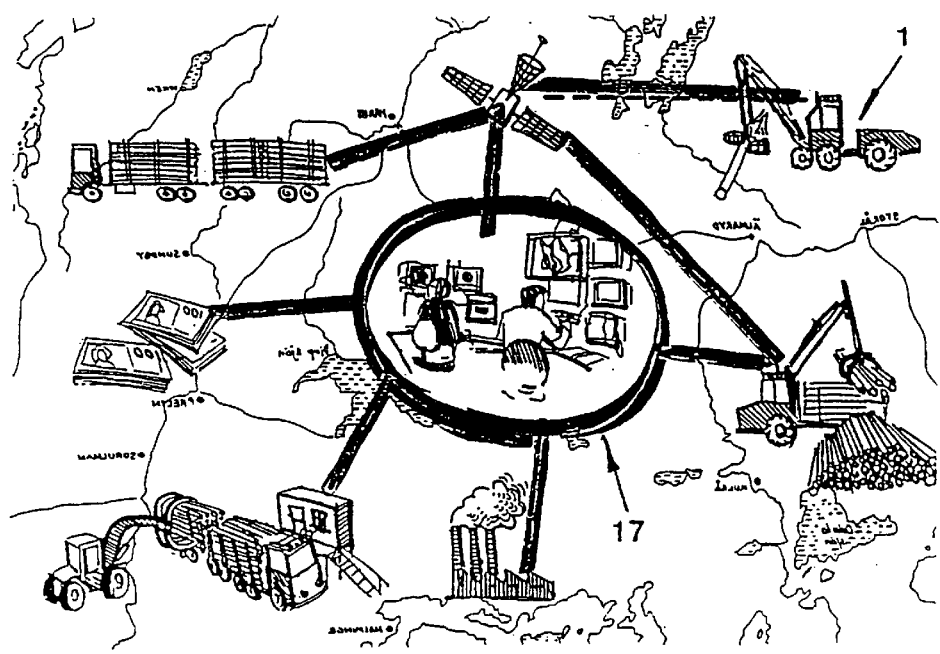
Fig 5
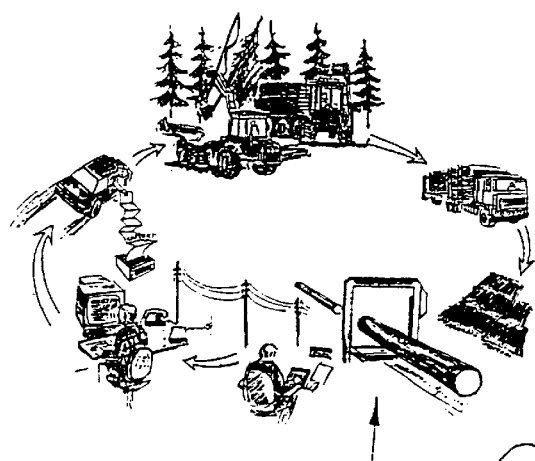
Fig 6
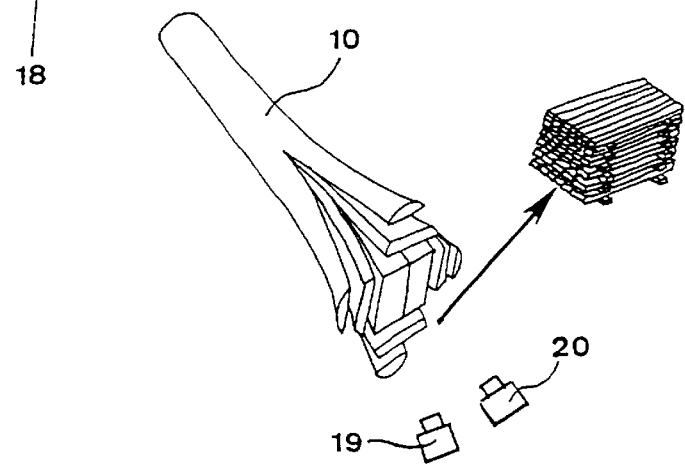

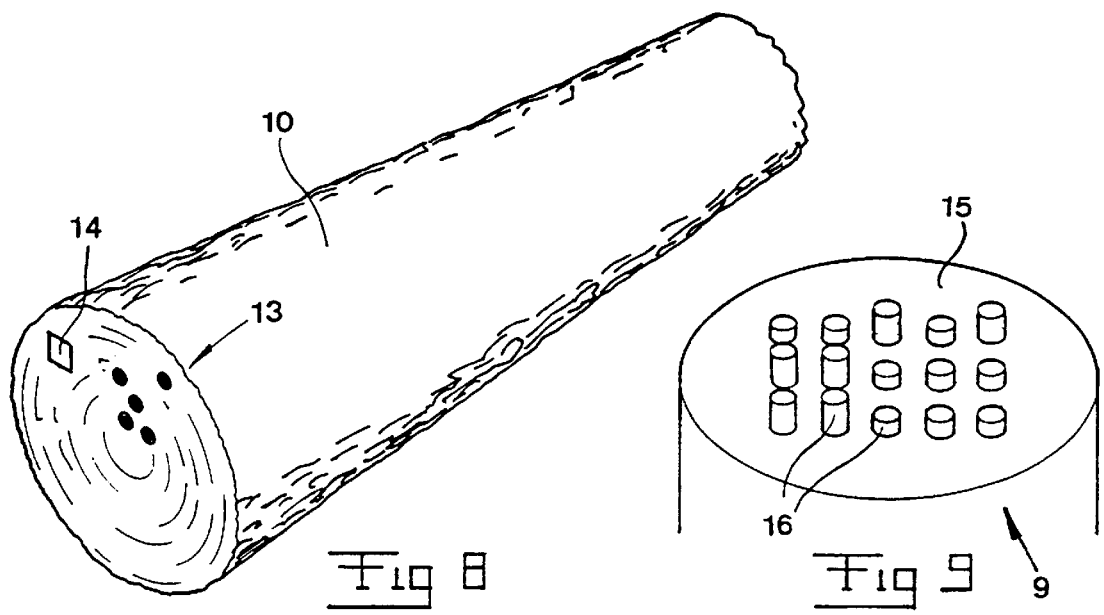
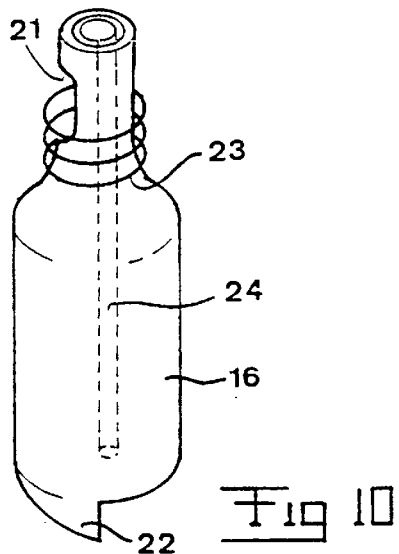
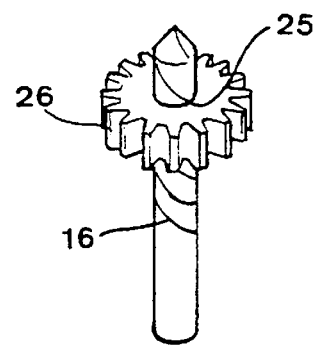
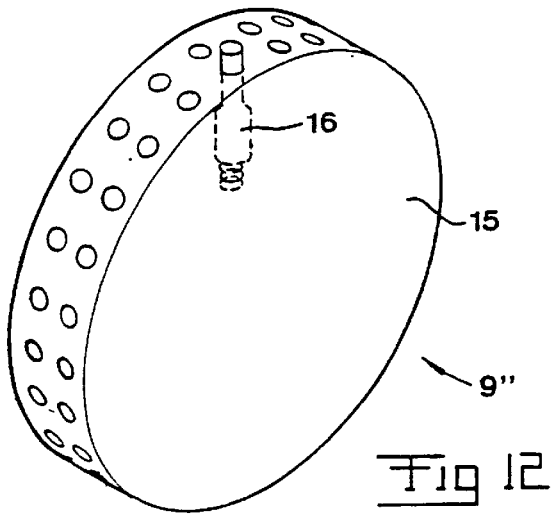
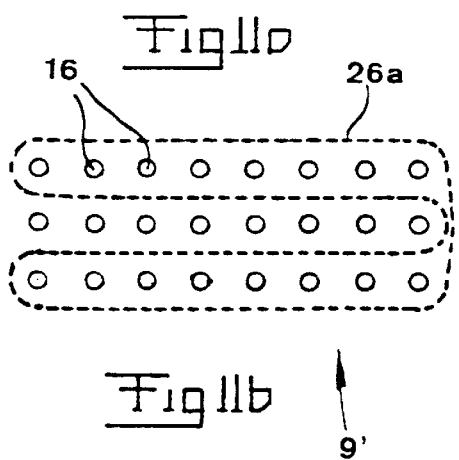

US 6,341,632 B1

METHOD FOR TIMBER HARVESTING AND SYSTEM FOR FORESTRY

CROSS REFERENCE TO RELATED APPLICATION

The present application is the national stage under 35 U.S.C. 371 of PCT/SE98/00788, filed Apr. 28, 1998.

FIELD OF THE INVENTION AND PRIOR ART

The present invention relates to a method and a system for timber harvesting and forestry.

Conventional timber harvesting and work operations in connection thereto are today carried out comparatively primitively in the sense that the forest raw material is nearly handled as a bulk product. Even if an evaluation of standing forest timber is carried out as a preparation for a certain harvesting this is regularly of a rather rough type. Accordingly, the real outcome of the harvesting may be considerably different than the outcome theoretically calculated. An additional problem of the timber harvesting technique of today is that it tends to be run in a comparatively small scale in the sense that as a rule only one seller and one buyer of wood raw material are involved in a certain harvesting. Borders between different forest owners have to be carefully considered, which is a consequence of the fact that the forest raw material is not possible to identify in detail. Furthermore, it is a fact that the driver of a harvesting machine today gets a very poor support when executing the harvesting work. There is per se as a rule a cross-cutting computer on the harvester but this computer does not obtain any other connection to the tree under processing than that which is obtained via the contact between the harvesting arrangement of the harvesting machine and the tree. There is, accordingly, well founded reasons to state that the precision of the cross-cutting work can be improved.

The consequences of the shortcomings mentioned above are considerable costs. A large amount of manual planning and administration work is required.

Attention is invited to U.S. Pat. No. 6,182,725, entitled "Method for Timber Harvesting and System for Forestry".

SUMMARY OF THE INVENTION

The object of the present invention is primarily to create conditions for rationalisation of forest harvesting and planning thereof.

According to a first aspect, the invention aims at creating improved possibilities to correct, in rational way, harvesting plans with consideration of the real result of the harvesting.

According to another aspect the invention aims at creating conditions for providing an improved computer support for the driver of the harvesting machine, a fully automatic control of the harvesting machine being intended primarily.

According to a third aspect the invention aims at creating conditions to handle the wood raw material not as an anonymous bulk product but as products having an identity of origin.

According to a fourth aspect of the invention it is intended to create even better follow-up of harvesting planning by extracting, late in the processing chain of the piece of timber, information regarding the real degree of utilisation of the piece of timber.

According to a fifth aspect of the invention it is aimed at to reduce the problem being connected to locate in the terrain pieces of timber having been processed by means of harvesting machines. Such localisation is as a rule carried out by forwarders, the task of which is to transport the timber out of the forest.

The first aspect of the invention is based upon the realisation that it is possible by means of extremely advanced remote registration and analysis technique to create very detailed and precise data bases concerning characteristics of a forest stand, the tree stand itself being included as well as the geographical and geological conditions therein. In the data base thus achieved, which may be said to involve a very accurate and exact reproduction of the forest stand, the individual tree is intended to be determined as to position with an accuracy in the order of some decimetre of a few centimetres. Furthermore, the individual tree should be carefully estimated with regard to wood quality and contents. As an example, it may be mentioned that the resolution of the data base should be such that a silvicultural planner by means of an ordinary computer mouse should be capable of clicking on an individual tree and turn and pivot the same and also achieve a computer based cross-cutting prognosis. In this connection the invention aims at creating conditions for a very accurate and rapid follow-up of the harvesting plan by feed-back of real harvesting data. The invention aspect relevant in this connection is dealt with in the enclosed claim 1.

The second aspect of the invention is achieved by that primarily defined in the enclosed claim 2, claim 3 defining an optimal development resulting in automatic control of the harvesting machine during harvesting. This aspect of the invention is based on the accurate position determination of the harvesting machine and in particular the harvesting arrangement thereof carried out according to the invention. Since the harvesting plan is intended to be extremely accurate and, besides, the position of the harvesting arrangement is accurately determinable in the terrain, the harvesting arrangement may be targetedly controlled in accordance with the premade harvesting plan so that predetermined trees become the subject of harvesting. This creates possibilities for a very advanced computer based harvesting planning where the driver of the harvesting machine primarily gets a purely correcting task, i.e. he is supposed to normally except that the harvesting machine and the harvesting arrangement thereof are automatically controlled to harvest selected trees.

The third aspect according to the invention is achieved by that defined in the enclosed claim 4.

Thus, the present invention delivers the solution that in a method for forest harvesting by means of a harvesting machine comprising a vehicle and a harvesting arrangement mounted thereon the position of the harvesting machine is determined in connection to felling a tree and at least one piece of timber obtained from the tree is marked with this position information or a code by means of which the piece of timber may be associated to actual position information stored in a data base.

The piece of timber so obtained will by this become an individual connectable to the location of growth in question, which means that the individual forest owner with certainty is able to determine if the piece of timber in question belongs to him or some other person after the transport of the piece of timber away from the very harvesting place.

The conversion of the timber raw material from a bulk product into individuals able to be identified described above means also that not only a plurality of sellers may be comfortably kept apart with respect to their products, but a plurality of buyers may also be handled on one and the same location of harvesting. When the idea of the invention is consummately utilised, position information marked on a piece of timber is intended to be that exact that it shall be possible to state from exactly which tree the piece of timber emanates. The analysis of the timber stand taken place before the harvesting is also intended to be carried out through the remote analysis technique discussed below that precisely that the individual tree may be unambiguously determined with respect to position and also be forecasted with a rather high accuracy with respect to timber quality and volume. Such an accurate analysis in advance means conditions for a very accurate calculation of the yield of a certain harvesting in advance. Furthermore, the very harvesting may be very targetedly controlled so that exactly the trees to be harvested for an optimum result also really get harvested. According to the invention a computer arrangement arranged on the harvesting machine may be adapted to control the harvesting machine on the basis of data emanating from the pre-analysis of the forest region and harvesting instructions determined on the basis thereof to only harvest exactly the trees determined in advance to be harvested. Such a high resolution, i.e. at the level of a single tree, may be achieved if an accurate registration of the forest is carried out by means of a photographical and other registration technique and these registrations are accurately coordinated to geographically correct conditions. Furthermore, a very high resolution is required with respect to the position determining device arranged on the harvesting machine. Such a high resolution is today already obtainable by means of the satellite-based GPS-system (GPS=Global Positioning System).

According to the fourth aspect of the invention the marking on the individual pieces of timber intended for sawing into boards is read before the sawing and this marking information is stored so that the boards emanating from the piece of timber may, by means thereof, be provided with a marking including at least information about the growth location of the original tree or a code, by means of which the piece of timber may be associated to the place of growth. Conditions for an additional check of the harvesting result with respect to both volume and quality are created thereby. It is possible to correlate information about the actual yield of boards from the piece of timber and identity information with respect to exactly this piece of timber in the sawmill so that an exact conclusion with respect to the yield of the individual tree may be made. The land owner gets substantially improved possibilities to check that forest stands valuable according to evaluations of standing forest timber carried out also really result in the economical yield expected and are not substantially degraded in the chain of handling the timber, for example as a consequence of an incompetent cross-cutting or an inadequate handling from another point of view.

According to the fifth aspect of the invention, the computer arrangement is adapted to determine and register the position of the harvesting arrangement at the time of discharge from the harvesting arrangement of processed pieces of timber and such position information is stored in the data base or on a data carrier to be used when subsequently fetching the pieces of timber by means of a forwarder. In this way it is insured that the pieces of timber may be safely found in the terrain. It is in this connection particularly preferred that position information with regard to the pieces of timber are presented to the forwarder driver in the forwarder so that he easily will be capable of moving the forwarder to the pieces of timber. According to a development, the movement of the forwarder is conceived to occur entirely automatically under control of a computer on basis of position information and also the premade planning of the forest stand.

Even if the optimum advantage of the invention is obtainable when the preanalysis and the harvesting take place with an accuracy corresponding to a resolution in the order of individual trees as discussed above, a less accurate resolution than that may be utilised when the idea of the invention is carried out to a smaller extent, for example a resolution in the order of one or some meters.

Specific features with respect to the system according to the invention appear from the following claims.

Details and advantages in connection to the invention are dealt with in the detailed description following.

BRIEF DESCRIPTION OF THE DRAWINGS

With reference to the appended drawings, below follows a specific description of preferred embodiments of the invention cited as examples.

In the drawings:

FIG. 1 is a view illustrating how data obtained by aircrafts or otherwise may be utilised for reproduction of landscapes in a digital topographical model with a high map accuracy, FIG. 2 is a schematic view illustrating a forest stand, in which more exactly a shows an aerial photograph of a portion of a forest, b a side elevation of a normal portion of a forest and c a schematic view of the portion of forest as seen from above, FIG. 3 is a view illustrating how pure landscape data and forest raw material data may be combined for facilitating strategical planning with respect to the forest, FIG. 4 is a schematic illustration showing a forest harvesting machine in a practical working situation, FIG. 5. is a schematic view illustrating how a forest harvesting organisation may be connected to an operating centre, FIG. 6 is a schematic view intended to illustrate how identity and origin with respect to a certain piece of timber may be followed in the flow to the customer as a consequence of the marking method according to invention, FIG. 8 is a schematic view illustrating how a piece of timber is marked at one end thereof according to the invention, FIG. 9 is a schematic perspective view illustrating a marking device with marking means movable between active and inactive positions, FIG. 10 is a schematic view of a marking means having the character of a punch, FIG. 11 a and b are schematic views illustrating an alternative marking device, FIG. 12 is a view showing an additional alternative to the marking device.

DETAILED DESCRIPTION OF A PREFERRED EMBODIMENT

Figure 7:
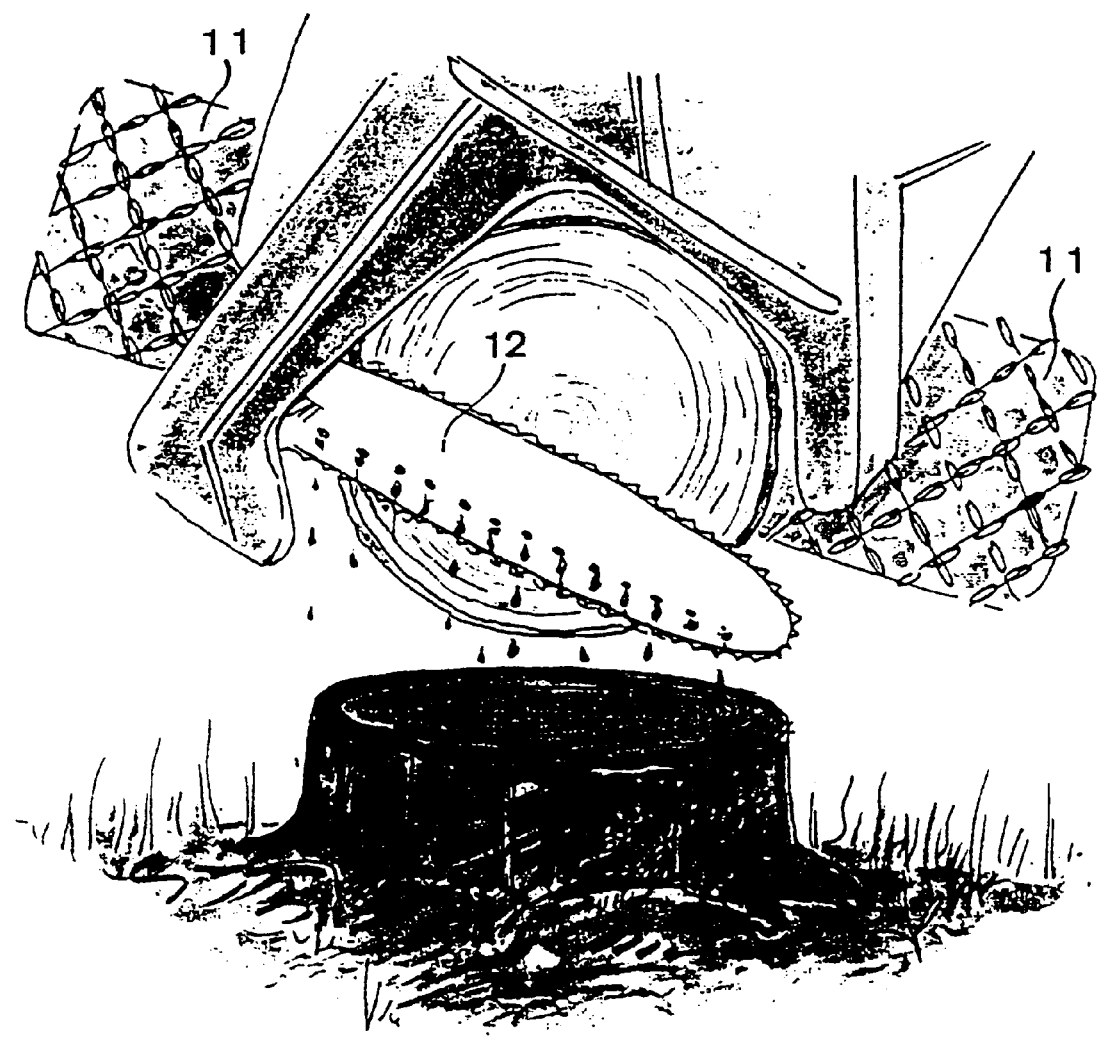
FIG. 7 is a perspective detailed view illustrating the discharging end of the harvesting arrangement provided with a cutting means.

It is desired to produce a basis for forestry decisions of high quality for completely utilising the advantages of the invention.

It is on one hand aimed at being able to establish descriptions connected to the ground (geology, quaternary geology, nature geography, hydrology, climatology, pedology, vegetation biology, nutrition geology and various planning maps) of a very high quality and with a high cost efficiency. It is illustrated in FIG. 1 how it is possible by means of different registration techniques, in particular from aircrafts, to derive data which may be used for reproducing the landscape in a digital topological model with a high map accuracy. Furthermore, it is required that the forest stand in the landscape region in question is accurately registered. Different techniques to register the forest stand from aircrafts, for example photogrammetry and picture analysis technique, are preferably also used here. An aerial photograph is illustrated in FIG. 2 at a, from which it is possible to distinguishing individual trees. By a suitable picture analysis technique and knowledge about characteristics of different types of trees and the living pattern thereof under different conditions, it is possible to get a comparatively accurate comprehension of the timber quality and timber volume with respect to individual trees. By a really accurate reproduction technique and relating the reproductions to exact map co-ordinates the individual tree may also be determined with respect to position at a very high accuracy, namely in the order of centimetres or at least decimetres. It is indicated in FIG. 2c how there is a tendency to apprehend the individual trees as inclining away from the centre of the picture in central projection with respect to the reproduction technique. A good evaluation of standing forest timber may be carried out while considering shadow effects, conicities of silhouettes of trees, diameters of leaf and needle masses, colours thereof etc. This evaluation may form a basis for very careful and exact decisions with respect to harvesting strategy.

It is illustrated in FIG. 3 how landscape and forest raw material data are combined in a cross-section reproduction facilitating the planning of the harvesting.

A harvesting machine generally denominated by 1 comprising a base vehicle denominated by 2 and a harvesting arrangement 3 mounted thereon is illustrated in FIG. 4. The harvesting arrangement 3 is in the example carried with respect to the base vehicle 2 by means of a crane 4. The harvesting arrangement 3 is here a so-called one grip harvesting arrangement, i.e. an arrangement adapted to grip a standing tree, cut it, lay the tree down to the position according to FIG. 4 and then by means of feeding means drive the log through the arrangement while simultaneously branching the log. The log may be cross-cut into individual pieces of timber by means of the cutting means. It is emphasised that the present invention is in this respect just as well applicable to cases in which there is a desire to abandon branching of the log, i.e. where it is only cross-cut into pieces of timber. However, the invention is also applicable to so-called full log handling, i.e. where the harvesting arrangement is utilised so as to cut the tree off and fell it, but after which no cross-cutting of the log into smaller pieces is carried out. The expression "piece of timber" used in the claims is in such a case intended to also cover the log as a whole. The harvesting arrangement may if desired be provided with branching means so as to relieve the log from branches by driving the log through the arrangement also in full log handling. A positioning determining device generally denominated by 5 is arranged on the harvesting machine and capable of determining the position of the harvesting machine by means of external signals received wirelessly. It is preferred that the positioning determining device operates according to the GPS-system (GPS=Global Positioning System). This is a satellite based positioning system creating conditions for a very high accuracy with respect to position determination. The satellite signals are in the reality disturbed. The disturbances are in the practice corrected by means of signals emitted from a ground station. These signals are received by the position determining device and may together with the satellite signals result in the very high position determining accuracy aimed at.

A GPS-satellite is indicated by 6 in FIG. 4, while an aerial of the position determining device 5 is indicated by 7. In the view within the enlarged circle in FIG. 4 it is indicated how the driver of the harvesting machine has access to a computer arrangement 8 with a displaying screen, which is connected to the position determining device. This computer may in the reality be the cross-cutting computer of the harvesting machine, provided with software and possibly hardware for the position determining treatment.

A marking device is arranged on the harvesting machine 1. This device is in one embodiment illustrated in FIG. 9 and is there generally indicated by 9. This marking device 9 is adapted to apply markings on pieces of timber obtained from trees. The marking device 9 is by means of the computer arrangement 8 controlled to mark the piece of timber (see for example the one indicated by 10 in FIG. 8) with position information, i.e. with information about the location of growth of the tree or a code, by means of which this position information may be associated to the piece of timber in question, by means of position information received from the position determining device 5. It will be described in the following that the piece of timber is provided with a special code, which is intended to be applied on the piece of timber as a marking and which is stored in the computer arrangement of the harvesting machine. This code has the purpose to serve for being able to track other information, such as quality and/or size of the piece of timber, stored in the computer arrangement. The code in question could for instance be formed by a number in a number series, of a time information sufficiently accurate to be able to distinguish between different harvested pieces of timber etc. The code could also be formed by a combination of a time information and a number in a number series, in which case the number for instance could be formed by the number of the piece of timber in a tree. The important thing is that the code may serve as a basis for associating a certain piece of timber to other stored data with respect to the piece of timber, such as a position information with respect to the place of growth of the piece of timber, quality and/or size regarding the piece of timber, silvicultural or geological conditions concerning the place of growth, altitude regarding the place of growth etc. The altitude last mentioned concerning the place of growth may be achieved with assistance of the GPS-equipment.

However, it is pointed out that it is within the scope of the invention to apply, as a marking on the piece of timber, position information regarding the place of growth of the piece of timber so that, accordingly, by reading the marking the tree may be associated to the place of growth without other data having to be extracted from a data base. In case full stems are not intended to be handled, it is desirable to supplement position information regarding the place of growth with a number regarding the location of the piece of timber in question in the tree. The piece of timber could also be provided with further in itself readable information regarding for instance quality, size etc. in particular when it is desired to associate substantial amounts of information to the piece of timber it is, however, normally to prefer to co-ordinate the piece of timber with a code and instead store the data in question in one or more data bases, the relevant data of which may be associated to the piece of timber by means of the code. In this connection it is pointed out that further data, which by means of the code should be associatable to the piece of timber, may be information regarding actual buyer of the piece of timber and possibly also information regarding the seller of the piece of timber.

The seller information is unnecessary would it be possible to connect the seller to the location of growth of the tree. The discharging end of the harvesting arrangement 3 is indicated in FIG. 7, i.e. the end where pieces of timber are discharged by means of feeding means 11 of the arrangement. The arrangement has at this discharging end a cutting means 12 intended to cut off the pieces of timber fed thereto. The cutting means 12 is in the example a saw sword being pivotally arranged and having a chain running around. Other cutting means may of course also be possible. The marking device according to the invention is preferably arranged at the outlet end of the harvesting arrangement, so that a piece of timber fed thereto according to an embodiment is intended to be marked immediately after cutting it off from the rest of the log. Accordingly, the marking may be applied on the end of a piece of timber falling freely, which puts rather high demands on the velocity. However, other embodiments are also well possible. Thus, the marking device may be adapted to apply the marking on the mantle surface of the piece of timber, possibly after relieving a portion of this mantle surface from bark. According to another embodiment it would also be possible to mark a piece of timber not separated from the rest of the log, but this means that then a prognosis has to be made with respect to the quality and volume of this piece of timber. If the prognosis will not be correct there will be a difference.

A possibility to carry out the marking of the piece of timber is to combine the marking,device and the cutting means 12, for example by providing the cutting means 12 with marking means suitable for the purpose. These may be of contacting as well as non-contacting type. The marking means may according to a possible embodiment have the character of spray nozzles adapted to spray a marking having an information content already discussed above on the piece of timber just being cut. A condition for this is a comparatively large number of spray nozzles. It would in principle be possible to apply a marking having a considerable information content over the entire end of the piece of timber. A more restricted information content is of course also conceivable in particular when only a code is intended.

It is illustrated in FIG. 8 how a piece of timber 10 schematically indicated has been provided with a marking indicated by 13 and consisting of a matrix of holes punched into the end of the piece of timber. The marking has suitably also a reference mark 14 for enabling an adequate reading of the matrix. The number of possible holes in the matrix may be very large, for example 100 or more depending upon on the volume of information required. It is advantageous to apply the marking in the end surface of a piece of timber, since this would normally facilitate the following reading of the marking information.

It is illustrated in FIG. 9 how the marking device 9 comprises a body indicated by 15, in which a number of marking means 16 are arranged. These have in the example the character of punching means, which are selectively moveable between active marking positions and inactive rest positions. The punching means are in the example intended to be in their active positions when they are projected and in their inactive positions when they are retracted. Thus these punching means are intended to be pressed against the end of the piece of timber so that the marking means active for the moment, i.e. projected, are projected into the end surface of the piece of timber.

It is illustrated in FIG. 5 how the harvesting organisation may be connected together to an operating centre 17, which may communicate with different units in the harvesting organisation through telephone and radio technique etc. The harvesting machine is indicated at 1. Information about the forest harvested is sent from the computer 8 thereof to the operating centre 17 and signals appropriate for controlling the harvesting work of the harvesting machine 1, for example so that the harvesting is focused upon an assortment asked for for the time being, are sent from the operating centre 17 to the harvesting machine 1. The operating centre 17 is for the rest in contact with other units in the harvesting organisation such as transporting vehicles and forest raw material consumers, for example sawmills and pulp industries. The operating centre 17 may through the GPS-system efficiently keep record of the location of the different harvesting units and efficiently plan the harvesting work. The operating centre 17 will at each point of time have data telling where volumes of timber are available and may be made available through harvesting, respectively, and which are the qualities and volumes considered, so that business agreements may be closed very quickly by means of the operating centre. Expressed in another way, the operating centre may function as an "electronic" timber exchange.

It is illustrated in FIG. 6 how the log 10 is ready for sawing it into boards in a sawmill. The sawing intake is schematically indicated by 18. A reproducing device 19 is arranged in connection to the sawing intake and adapted to reproduce an end surface of the piece of timber before the sawing and register and store information in this picture with respect to shape, for example diameter and thickness of bark, and/or growth, for example annual ring widths. By means of information obtained through the reproducing device 19 equipment included in the system may produce analyses and prognoses with respect to forest growth over the time relating to the forest region from which the pieces of timber emanate. Correction of harvesting plans may also occur. A condition for this is of course that a reading device 20 is present and arranged at the sawing intake to read the marking of an individual piece of timber and store the marking information. A computer arrangement associated with the sawmill is adapted to control an additional marking device in the sawmill to provide boards deriving from the piece of timber 10 in question with a marking in the form of a code associatable to at least information about the original location of growth of the tree. Boards may in this way be obtained, which may be checked with respect to location of growth, so that buyers having an environment consciousness may ensure that they buy boards coming from sources being acceptable from the environmental point of view.

The reproducing device 19 and the reading device 20 may of course in tie reality consist of one and the same unit.

The marking of the piece of timber 10 and the reading of this marking makes it possible to correlate the marking with information about the real economical yield of the piece of timber after the sawing. Data concerning this yield and the location of growth of the piece of timber may then be compared with information already present in the forest data base, namely information initially obtained within the frame of the evaluation of standing forest timber and then information applied on the piece of timber in connection to the harvesting by means of the marking device combined with the harvesting arrangement.

It is illustrated in FIG. 10 how the marking means 16 already indicated in FIG. 9 could be constructed. The marking means having the character of a punch has suitably a tube-like front end, which upon pressing into the wood material of the piece of timber will receive a piece of wood. The punching means 16 has a lateral opening 21 through which wood material entering into the tube-like end of the punching means may exit. The punching means 16 is rotatably arranged about an axis in parallel with the punching direction, so that accordingly the wood material entering into the punching end of the punching means may be broken apart from the piece of timber and may be brought to exit through the opening 21.

A cam-like projecting means 22 is arranged for projecting the punching means 16 to the active position thereof, and this means is adapted to both project the punching means and make it turn. The projecting means 22 turns at the return movement thereof the punching means back to the starting position thereof. The projecting means 22 may then also be arranged to forcedly retract the punching means or as an alternative (or as a complement) a spring 23 indicated in FIG. 10 may serve for the returning movement.

It is possible to combine the punching means 16 in FIG. 10 with an ink marking, suitably by providing the punching means with an ink channel 24, through which marking ink is supplied from a source to the region of the front mouth of the punching means. Thus, the intention is that the hole resulting in the end of the piece of timber after punching shall be provided with ink so that this appears clearly.

An alternative 9' of the marking device is illustrated in FIG. 11. The marking means 16 consist here of a number of comparatively small drills arranged in a matrix and accordingly rotatably arranged. Each of these drills may for example be adapted to be received in a centre opening 25 of a gear denominated by 26, which on the outer side thereof has a toothing intended to engage with a cam belt 26a. The drills 16 and the hole 25 in the gear have engaging means preventing relative rotation of the drills with respect to the gear. When the cam belt 27 is running in the path shown in FIG. 11b, the cam belt is accordingly intended to be engaged with the different gears 26, which accordingly are rotated and the drills 16 are at the same time brought to rotate. The drills 16 are displaceable axially with respect to the gears 26, so that accordingly the drills desired may be brought into active marking positions by axial displacing means not illustrated in FIG. 11. The function is then similar to that already described by means of FIG. 9, i.e. the drill-like marking means 16 to be active for the moment are projected, while the other are kept retracted.

In the alternative 9" illustrated in FIG. 12 the body 15 of the marking device has the character of a rotatable wheel. The marking means 16 are here radially movable, so that they may be brought to project through peripheral openings in the wheel. Accordingly actuating means are arranged inside the wheel so that the marking means 16 may selectively be brought to protrude and by that give the piece of timber in question the marking aimed at. The marking device according to FIG. 12 could be utilised so as to mark the mantle surface of the piece of timber, possibly on a portion relieved from bark or otherwise through or on the very bark, but it would also be possible to adapt the wheel principle when marking the end surface of a piece of timber.

Other marking techniques are of course also conceivable. A beneficial marking technique is based on the use of means emitting laser jets, which apply the marking aimed at on the log, for example in the form of a bar code or in another way. A number of laser marking means could be arranged in matrix form in the way already described with respect to the mechanical embodiments. Other radiant energy besides the laser technique may of course be utilised for marking purposes.

It is also possible to design the marking device so that it applies the marking information required on a separate carrier, which in its turn is applied on the piece of timber. This could for example be a strip provided with marking information in the form of a bar code or another code.

Figure 13:
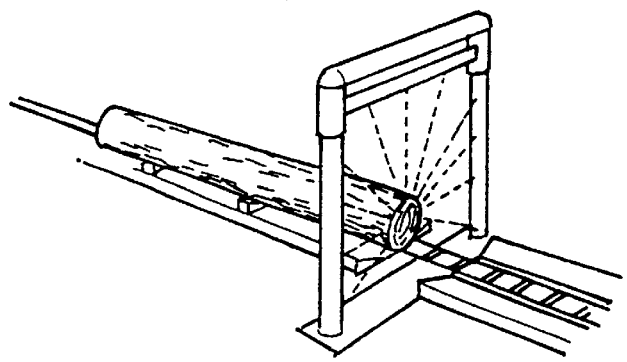
FIG. 13 is a perspective view of a cleaning device in connection to the intake of a sawmill.

It is illustrated in FIG. 13 how a particular cleaning equipment may be arranged at the intake to a sawmill for relieving a piece of timber from contaminations, snow or ice, which otherwise would tend to render the reading of the marking information more difficult. The cleaning device may for example have the character of a steam shower. In the case that marking information is only applied on the end of the wood unit it is of course sufficient to carry out the cleaning operation there. It is emphasised that reading devices such as those indicated by 19 and 20 in FIG. 6 may of course not only be arranged in connection to a sawmill or the like. Such reading devices could be arranged on other locations, where there is a need to assort pieces of timber depending upon the marking present thereon. Thus, each buyer may be supplied with the pieces of timber he needs. The marking technique means in general that each individual piece of timber may be handled individually in the harvesting system described by means of FIG. 5, so that a buyer accordingly has substantially better prospects of really arriving to a possession of pieces of timber best suited for his fields of use.

Figure 14:
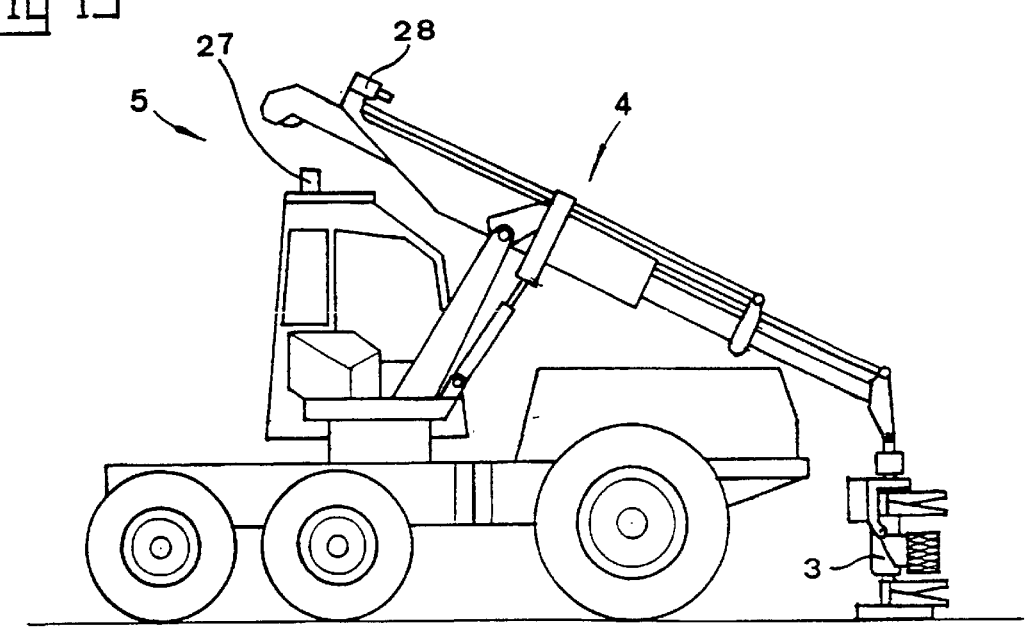
FIG. 14 is a schematic view illustrating a harvesting machine provided with a position determining device comprising a position determining unit on the vehicle of the harvesting machine and means for determining the position of the harvesting arrangement with respect to the position determining unit.

A harvesting machine as before having a position determining device 5 is illustrated in FIG. 14. The crane utilised in FIG. 14 has somewhat other construction than the one illustrated in FIG. 4. The position determining device 5 is as in the embodiment according to FIG. 4 in the embodiment according to FIG. 14 so designed that it has a position determining unit 27 on the vehicle, for example on the cabin being turnable in this example, while the position determining device also comprises means for determining the position of the harvesting arrangement 3 with respect to the position determining unit 27. Since the position of the unit 27 is known and the relative position of the unit 27 and the arrangement 3 may also be determined, a tree present in the arrangement 3 will accordingly also in the reality be determined with respect to position.

The means for determining the position of the harvesting arrangement 3 with respect to the unit 27 comprise in FIG. 14 a distance meter indicated by 28, for example of laser type, which is capable of measuring the distance therefrom to the log of a tree held in the arrangement 3. If this distance meter 28 is combined with angle sensors in each hinge between two mutually moveable arm parts in the crane and also a direction sensor (compass) on the crane 4 or the cabin, the distance and direction of the arrangement 3 from the unit 27 could be very accurately determined. The position of the arrangement 3 may then be compared with data in the computer of the harvesting machine, so that the driver could compare the actual position of the harvesting arrangement 3 with the desired position according to the harvesting instruction. The driver could by this much easier find the trees, which he has to eliminate according to the harvesting instruction.

Figure 15:
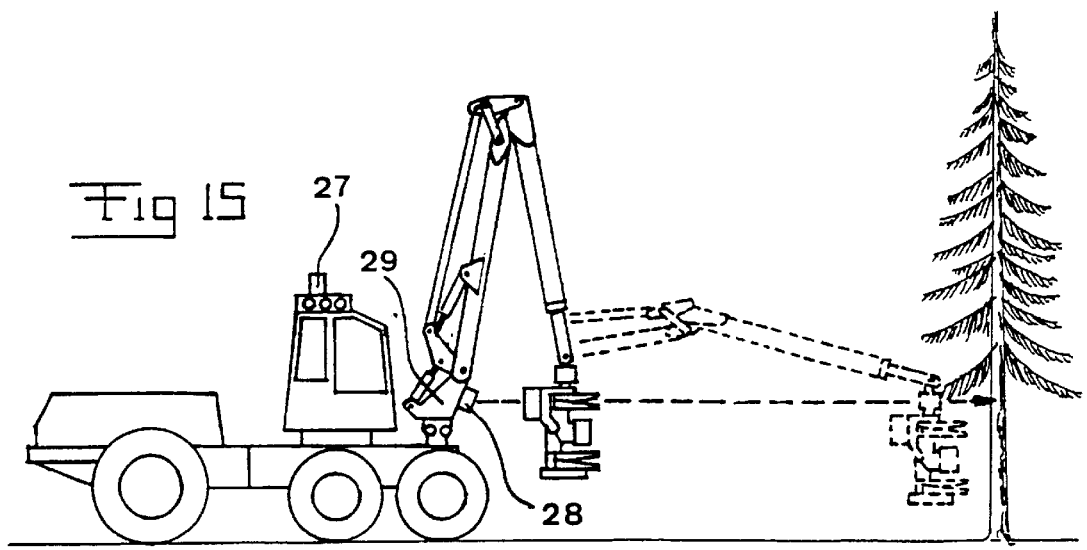
FIG. 15 is a view of a solution being an alternative to that illustrated in FIG. 14.

A somewhat different type of harvesting machine is illustrated in FIG. 15. The very vehicle is also here intended to have a position determining unit 27 and a distance meter indicated by 28. The meter serves for measuring the distance between the log and a part 29 of the crane solely turnably moveable with respect to the vehicle. In the case that the part 29 and the vehicle cabin, i.e. the part where the unit 27 is mounted, are not mutually turnable but turn as a unit around a vertical axis only one sensor is required besides that, i.e. a compass, for turning adjustment of the cabin/part 29. Would it however be so that the part 29 would be turnable around a vertical axis with respect to the cabin an additional angle sensor would be needed between this part 29 and the rest of the vehicle.

Figure 16:
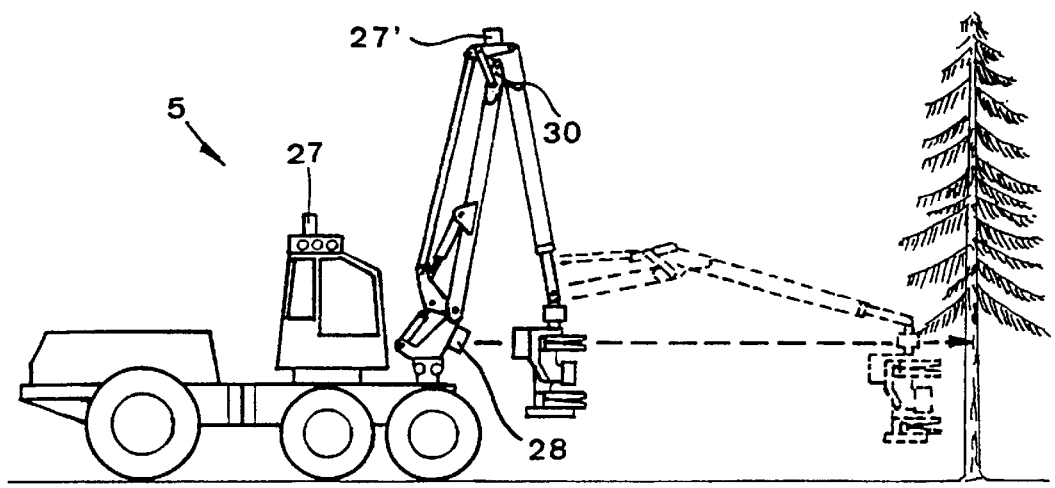
FIG. 16 is a further alternative.

An alternative, in which the position determining device 5 comprises two position determining units 27 and 27', respectively, is illustrated in FIG. 16. It appears that the unit 27 is arranged on the vehicle cabin, while the unit 27' is located on the crane.

The presence of two such position determining units, which are suitably connected to the computer arrangement 8, which is present in the harvesting machine, and capable of evaluating signals from the units for position determining purposes, means that the direction of the crane may always be determined, also during movement. This embodiment has as in the previous embodiment a distance meter 28. This means that the only further sensing device required for unambiguously determining the position of a log present in the harvesting arrangement is an angle sensor indicated by 30 between the two outermost arm parts of the crane. It is in this context pointed out that the second position determining unit 27' should suitably not be placed too close to the harvesting arrangement since it will then be a risk that it is damaged and for the rest will be hidden by branches, needle and leaf systems.

Figure 17:
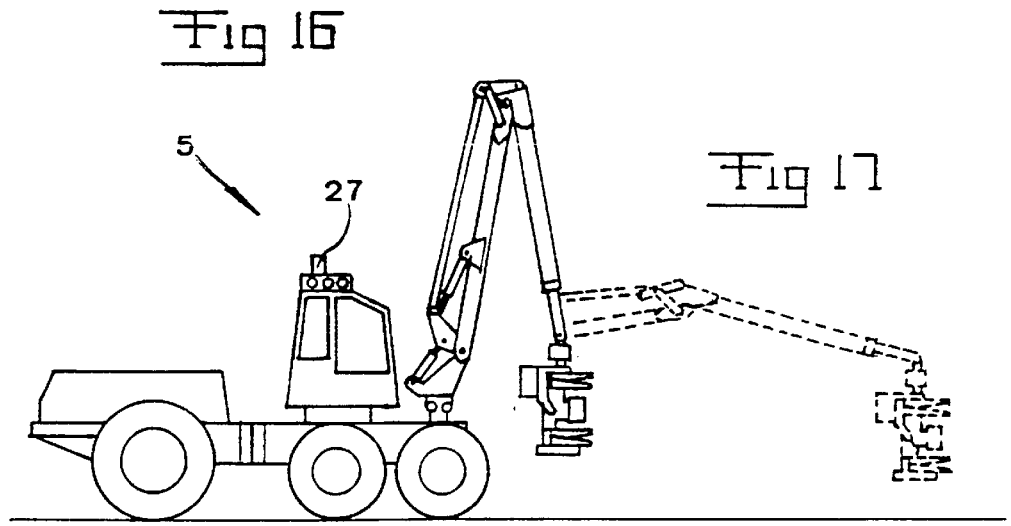
FIG. 17 is a still further alternative.

The alternative illustrated in FIG. 17 has again a position determining device 5 with a position determining unit 27 on the vehicle cabin. The embodiment is in the alternative according to FIG. 17 intended to be such that at each hinge connection in the crane there is an angle sensor. This is also valid for the connection between the crane and the vehicle. Furthermore, the arrangement has to be completed by a direction sensor, i.e. a compass for determining the crane direction with respect to the position determining unit 27.

Figure 18:
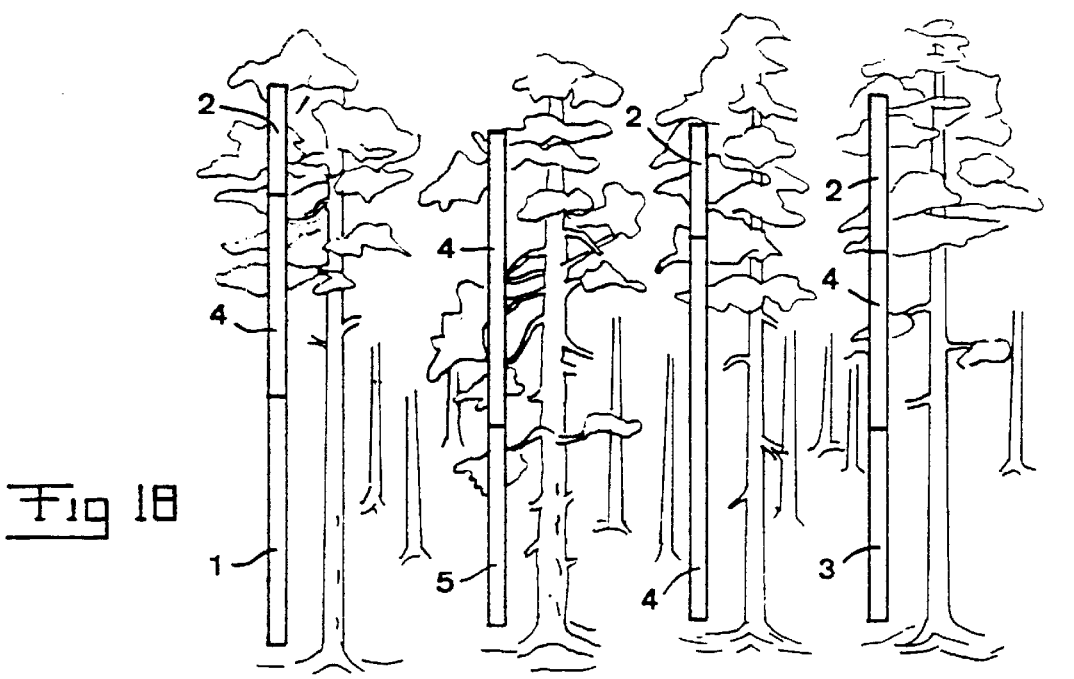
FIG. 18 is schematic view illustrating how a scanner arranged on the harvesting machine may be utilised for scanning trees to be harvested so that scanning information may be utilised by means of the control unit for taking decisions with respect to cross-cutting or a prognosis of cross-cutting.

It is diagrammatically illustrated in FIG. 18 how the distance meters 28 present in FIGS. 14, 15 and 16 could be brought to fulfill an additional function, namely as scanner for scanning trees to be harvested before felling the tree in question. Such a scanner, for example of the laser type, is suitably connected to the control unit in the harvesting machine for supplying scanning information thereto, which is utilised by the control unit for determining cross-cutting or making a cross-cutting prognosis. It is schematically illustrated in FIG. 18 how picture information with respect to adjacent trees created by the scanner 28 may be utilised as basis for giving cross-cutting suggestions after suitable signal treatment in the computer beside the trees in question (the columns provided with numerals beside the trees in FIG. 18), quality classes also being possible to state.

The prognosis of cross-cutting determined by the scanner 28 could be compensated or adjusted by an adequate comparison with the measuring result given rise to by the previous evaluation of standing forest timber with respect to the individual tree. Thus, this means that the driver of the harvesting machine could through the computer 8 in the harvesting machine receive a substantially more refined cross-cutting suggestion from the control unit.

It is emphasised that the application of the invention is of course not restricted to the type of harvesting machines illustrated in the drawings. Accordingly, the invention is also applicable to such harvesting machines in which in the crane only a so called felling head is arranged, i.e. a unit capable to cut off and lay down a tree, which then by means of the crane is laid into a processing machine arranged on the vehicle chassis, which normally includes both branching means and cutting means. Thus, in such a machine it is the very felling head that has to be considered as equivalent to the harvesting arrangement discussed in the description above in the sense that it is the position of the felling head in the terrain that is to be determined so as to by that determine the position of the tree. Otherwise expressed, it is completely offset with respect to the idea of the invention whether additional processing equipment besides the tree felling part is combined with the tree felling part, i.e. mounted on the crane, or instead arranged on the vehicle chassis so that the logs are laid by means of the crane into the processing part.

Figure 19:
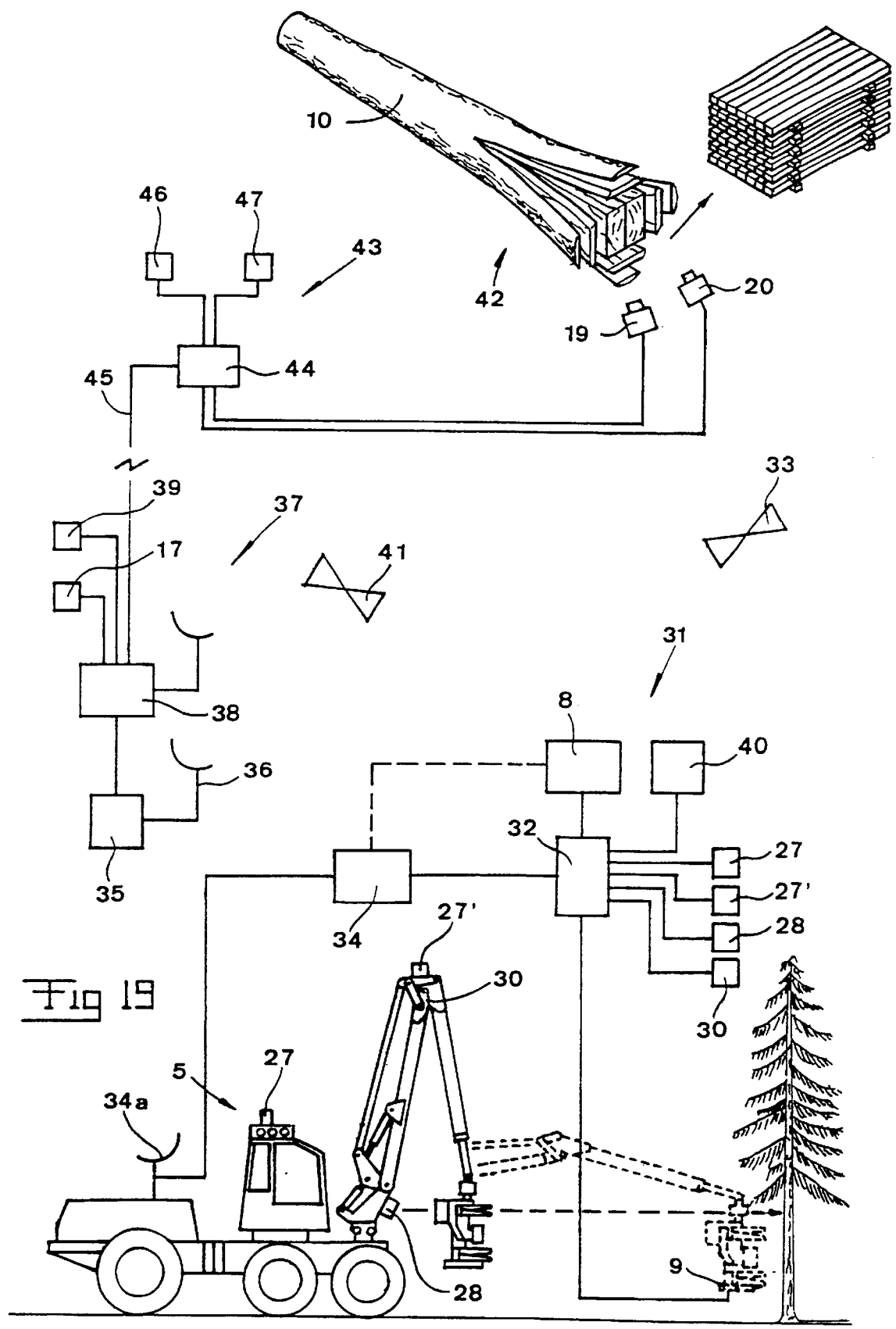
FIG. 19 is a schematic view illustrating how data can be registered and utilised for achieving a very rational forestry system in a practical application of the invention.

FIG. 19 illustrates diagrammatically a possible embodiment of the invention. The cross-cutting computer previously described is denoted 8. The computer arrangement as a whole on the harvesting machine 1 is denoted 31. The computer arrangement comprises, apart from the cross-cutting computer 8, a further computer 32 adapted to obtain a position information corresponding to the actual position of the harvesting machine from one or two occurring GPS-units 27, 27', 28 denotes one or more scanners or similar to determine the distance to and scan respectively a part of the forest stand present in front of the driver of the harvesting machine. 30 represents diagrammatically angle determining means etc. previously discussed.

As the harvesting work proceeds, the cross-cutting computer 8 registers quality and size regarding the pieces of timber. The further computer 32 establishes by means of information received from the components 27–30 the position of the harvesting arrangement. The computer 32 may now by means of the marking device 9 apply the previously discussed marking on the piece of timber, preferably in the form of a code. This code is by means of the computer 32 related to data characteristic for the piece of timber and established by the cross-cutting computer 8. These data are stored by the computer 32.

The GPS-units 27, 27' obtain signals required for position determination from a satellite 33 or the like and additional signals required for position determination.

The computer 32 and possibly also the cross-cutting computer 8 are adapted to communicate wirelessly, via a transmitter/receiver 34 coupled to an antenna 34a, with a transmitter/receiver 35, which also comprises an antenna 36 and is coupled to a base computer 38 included in a second computer arrangement 37. Thus, data are wirelessly transferable to the base computer 38 from the computer 32 on the harvesting machine. Data received by the base computer 38 are stored in one or more data bases belonging to one or more second computer arrangements 37. Such second computer arrangements 37 may be distributed in a suitable number over the country. The operating centre 17 discussed with assistance of FIG. 5 is indicated as coupled to the base computer 38. Thus, the operating centre 17 may receive, from the base computer, data required for evaluation and control purposes. 39 denotes a forest planning unit, i.e. a unit intended to feed, to the base computer 38, forest maps, harvesting plans etc. These may then be delivered to the harvesting machine wirelessly and may be used for guiding the driver of the harvesting machine, for instance via a picture screen 40 or so that the harvesting machine is automatically controlled depending upon data received. Thus, these data should be so accurate that the harvesting machine with guidance thereof may be moved automatically in the terrain and be caused to automatically harvest trees, which in the harvesting plan have been decided to be harvested.

FIG. 19 also indicates that a satellite 41 may be used for providing communication between the base computer 38 and the computer arrangement 31 on the harvesting machine.

FIG. 19 also illustrates diagrammatically a sawmill 42 having its previously discussed reproduction devices 19, 20. The sawmill 42 is intended to comprise a third computer arrangement 43 having a computer 44. This receives information obtained from the reproduction devices 19, 20 and transmits this information further to the base computer 38, possibly via a wireless connection 45. Accordingly, the base computer 38 obtains from the sawmill 42 information about the timber receiving the sawmill and the properties thereof so that data stored in the base computer 38 may be supplemented and corrected respectively. This means that there are possibilities to, for instance, compare the harvesting plan with the timber gain really obtained in the sawmill so that weak links in the production chain may be identified. The computer 44 in the sawmill 42 may be coupled to a marking device 46 and a sorting device 47. Boards or groups of boards resulting in the sawmill may be provided with a marking, by means of the marking device 46, in the form a code which is associatable to data regarding place of growth for trees, from which the boards derive, quality and size information etc. The sorting device 47 connected to the computer 44 is intended to be controlled by the computer 44 so that boards deriving from a certain tree or a certain group of trees are brought together to a package or other board gathering so that conditions are provided to mark this gathering with a code as just described.

The system described in FIG. 19 enables continues and automatical data exchange between the computer arrangements included. As a complement to what has just been described, it should be pointed out that the computer 32 on the harvesting machine besides could be able to store information regarding the place where pieces of timber have been discharged by the harvesting machine so that on subsequent fetching of those pieces of timber the driver of a forwarder via wireless transmission from the computer 32 or, if data have been transmitted to the base computer 38, from the latter may be obtained and form a basis for directing the forwarder to the place where pieces of timber are present for fetching.

The system described according to FIG. 19 enables a continues harvesting direction from the operating centre 17, i.e. that the harvesting work may be directed at a very large distance from the centre.

It is realised that the invention is not solely restricted to the embodiments discussed above. It is for example pointed out that it would be possible to determine the position of the harvesting arrangement with respect to a position determining unit arranged on the harvesting machine by means of arbitrary sensing techniques, such as videophotogrammetry, another video technique etc. It is in general pointed out that many modifications are offered for the man skilled in the art once the basic idea of the invention has been presented.

What is claimed is:

1. A method for forest harvesting by a harvesting machine comprising a vehicle and a harvesting arrangement mounted thereon, characteristics of a forest portion in question being, prior to harvesting, registered, analysed and processed to a data base having a high geographical accuracy and a high precision as to the characteristics of the forest stand, a harvesting plan being made based on the data base and the result of the harvesting being compared to the harvesting plan, a first computer arrangement being provided on the vehicle, said computer arrangement being adapted to register quality and/or size with regard to harvested pieces of timber, comprising harvesting using a position determining device arranged on the harvesting machine and capable of determining, by wirelessly receivable signals, the position of the harvesting machine or the harvesting arrangement, co-ordinating data regarding the position of the harvesting machine or the harvesting arrangement, by the first computer arrangement, with data regarding quality and/or size of pieces of timber, transferring co-ordinated data to a second computer arrangement containing the data base, and using said co-ordinated data as a basis for correcting the harvesting plan and accordingly the execution of the harvesting by the second computer arrangement.

2. A method for forest harvesting by a harvesting machine comprising a vehicle and a harvesting arrangement mounted thereon, characteristics of a forest portion in question being, prior to harvesting, registered, analysed and processed to a data base having a high geographical accuracy and a high precision with respect to characteristics of the forest stand, the harvesting plan being made on basis of the data base, comprising harvesting using a position determining device arranged on the harvesting machine and capable of determining, by wirelessly receivable signals, the position of the harvesting machine or the harvesting arrangement, presenting a reproduction of that part of the forest stand which is ahead of the driver and which is contained in the data based harvesting plan to a driver of the harvesting machine together with indication of a harvesting proposal by a first computer arrangement provided on the harvesting machine.

3. A method according to claim 2, characterised in that the first computer arrangement is adapted to automatically control the harvesting machine to harvest in accordance with the harvesting proposal.

4. A method for forest harvesting by a harvesting machine comprising a vehicle (2), a harvesting arrangement (3) mounted thereon, a computer arrangement (31) provided on the vehicle to register quality and/or size with respect to harvested pieces of timber and a marking device (9) arranged on the vehicle to apply a marking (13) on pieces (10) of timber obtained from trees, comprising determining the position of the harvesting machine by at least one position determining device (5) arranged on the harvesting machine, said position determining device (5) being capable of determining the position of the harvesting machine from external, wirelessly receivable signals, in connection n with felling a tree, and marking at least one piece of timber obtained from the tree by the marking device (10, 9) with information from said position determining device or a code, wherein the piece of timber is associatable to position information, or the code being used for associating with quality and/or size data concerning the pieces of timber in question.

5. Method according to claim 4, characterised in that the piece of timber also is marked with information regarding quality and/or size.

6. Method according to claim 5, characterised in that in the case that a plurality of pieces of timber are obtained from a tree, every current piece of timber is marked with information regarding its location in the timber log.

7. Method according to claim 4, characterised in that information regarding a buyer and/or a seller of an individual piece of timber is stored and that the piece of timber is associated to said information about buyer and/or seller by position information or the code.

8. Method according to claim 4, characterised in that the marking is carried out by a marking technique contacting the piece of timber.

9. Method according to claim 4, characterised in that the marking is carried out by a non-contacting marking technique.

10. Method according to claim 4, characterised in that the harvesting machine position information refers to the position of the harvesting arrangement of the harvesting machine.

11. Method according to claim 4, characterised in that the marking of the piece of timber is carried out on an end thereof.

12. Method according to claim 4, characterised in that the marking is carried out on a portion of the mantle surface of the piece of timber optionally after said portion has been relieved from bark.

13. Method according to claim 4, characterised in that data determined at the harvesting and regarding growth locations, qualities, sizes and optionally locations in the tree of the pieces of timber are stored for evaluating purposes and are compared with prognoses concerning the outcome of the harvesting, said prognoses being made before the harvesting.

14. Method according to claim 1, characterised in that an evaluation of standing forest timber is accomplished before the harvesting concerning single trees or relatively small timbered surfaces within an area that is to be harvested or thinned, by remote analyses.

15. Method according to claim 14, characterised in that the harvesting is controlled with the aid of said evaluation of standing forest timber by data provided to the harvesting machine so that the harvesting of timber qualities and sizes demanded for the moment are prioritized during the harvesting.

16. Method according to claim 4, pieces of timber obtained being sawn to boards in a sawmill, characterised in that in the sawmill the marking on an individual piece of timber is read and stored together with information about the piece of timber, said information comprising data on the quality and/or size and/or other properties thereof and/or the yield from the piece of timber from the sawing and that these data are utilised for evaluation/correction of the harvesting prognoses made.

17. Method for sawing of pieces of timber harvested according to the method in claim 4 to boards, characterised in that the marking of an individual piece of timber is read before the sawing and stored and that boards from this piece of timber are provided with a marking including at least information about the growth location of the original tree or a code, by which the boards may be associated to information present in a data base about this place of growth.

18. Method for sawing pieces of timber harvested according to the method in claim 4 to boards, characterised in that an end surface of the piece of timber is reproduced before the sawing to provide information concerning said timber and information in this reproduction regarding shape, and/or growth, is registered and stored.

19. Method according to claim 18, characterised in that analyses and prognoses regarding forest growth over a time period are carried out supported by said information about shape and/or growth concerning the forest area from which the pieces of timber emanate or that comparisons are made with harvesting plans made prior to harvesting.

20. Method according to claim 4, characterised in that trees, which are to be harvested by means of the harvesting machine, are scanned by a scanner before the tree is felled, said scanner being arranged on the harvesting machine, and that the scanning information is utilised as guiding means for the cross-cutting or a cross-cutting prognosis.

21. System for forestry including timber harvesting by a harvesting machine (1) comprising a vehicle (2), a harvesting arrangement (3) mounted thereon, a marking device (9) arranged on the harvesting machine (1), said marking device being arranged to apply a mark (13) on at least one piece (10) of timber obtained from a tree, and a computer arrangement (31) arranged on the harvesting machine, said computer arrangement being arranged to control the marking device to mark the piece of timber, wherein at least one position determining device (5) is arranged on the harvesting machine for determining the position of the harvesting machine by external, wirelessly receivable signals, and the computer arrangement (31) is arranged to control the marking device (9) to mark the piece of timber with position information or a code, whereby the piece of timber is associatable to position information stored in a data base, on the basis of position information received from the position determining device (5).

22. System according to claim 21, characterised in that the harvesting machine comprises means for determining/input of information regarding the quality and/or size of the piece of timber and that the computer arrangement (31) is arranged to control the marking device to mark the piece of timber with quality and size information or register said information as associatable to the piece of timber by said code.

23. System according to claim 21, characterised in that the harvesting machine comprises means for an automatic determining/manual input of information regarding the location of a current piece of timber in a log from said tree and that the computer arrangement is arranged to control the marking device in order to mark the piece of timber with this location information or register this location information as associatable to the piece of timber by means of the code.

24. System according to claim 21, characterised in that the computer arrangement comprises means for receiving information regarding the buyer and/or the seller of an individual piece of timber and that the computer arrangement is adapted to control the marking device to mark the piece of timber with said information regarding buyer and/or seller or register this information as associatable to the piece of timber by the code.

25. System according to claim 21, characterised in that the computer arrangement is adapted to determine and register the position of the harvesting arrangement at the time of discharge from the harvesting arrangement of processed pieces of timber to provide position information, and that said position information is stored in a data base or on a data carrier for use in subsequent fetching of the pieces of timber by a forwarder.

26. System according to claim 21, characterised in that the position determining device operates in accordance with the GPS-system (GPS=Global Positioning System).

27. System according to claim 21, characterised in that the marking device (9) is on the harvesting arrangement (3) of the harvesting machine to subject pieces of timber to marking in connection to a timber log being processed in the harvesting arrangement.

28. System according to claim 21, characterised in that the marking device is arranged to operate with a contacting marking.

29. System according to claim 21, characterised in that the marking device is arranged to mark the pieces of timber with a non-contacting marking technique.

30. System according to claim 28, characterised in that the marking device comprises a plurality of marking means (16) for contacting the piece of timber, said marking means being selectively movable between active marking positions and inactive rest positions, whereby the intended marking information for the piece of timber is put together by the computer arrangement depending on desired marking information.

31. System according to claim 30, characterised in that the marking means (16) comprises punching means, stamping means or drilling means.

32. System according to claim 31, characterised in that the marking device has means (24) for supplying marking ink to the marking means.

33. System according to claim 28, characterised in that the marking device is arranged to generate a carrier provided with the marking information and to apply the carrier on the piece of timber.

34. System according to claim 33, characterised in that the carrier consists of an adhesive strip with the marking information.

35. System according to claim 29, characterised in that the marking device has one or several lasers to apply the marking information on the piece of timber.

36. System according to claim 28, characterised in that the marking device comprises a carrier carrying marking means, said carrier comprising a roller (15).

37. System according to claim 21, characterised in that the marking device is adapted to apply the marking on one end of the piece of timber.

38. System according to claim 21, characterised in that the marking device is adapted to apply the marking on a portion of a mantle surface of the piece of timber, optionally after this portion having been relieved from bark.

39. System according to claim 21, characterised in that the first mentioned computer arrangement (31) is adapted to wirelessly transfer data determined during the harvesting to a data base (38) in a second computer arrangement (37), said data regarding growth locations, qualities, sizes and optionally locations in the tree of the pieces of timber, for subsequent comparison with prognoses regarding the harvesting result made before the harvesting.

40. System according to claim 21, said system comprising a sawmill (42) for sawing of the pieces of timber into boards, a reading device (19, 20) to read the marking on an individual piece of timber before the sawing and to store the marking information, and a further computer arrangement (43) connected with the sawmill to control a further marking device (46) in order to provide boards or groups of boards from the piece of timber in question with a marking comprising at least information about the growth location of the original tree or a code, by which said information is associatable to the boards.

41. System according to claim 40, further comprising a reproduction device (19, 20) to reproduce an end surface of the piece of timber before the sawing and to register and store information in the resultant reproduction regarding shape and/or growth.

42. System according to claim 41, characterised in that it comprises equipment to generate analyses and prognoses regarding forest growth over time concerning the forest area from which the pieces of timber emanate with the aid of said information regarding shape and/or growth.

43. System according to claim 21, characterized in that a scanner (28) is provided on the harvesting machine to scan a tree which is to be harvested before the tree in question is felled, and that the scanner is connected to the first computer arrangement (31) in order to transfer scanning information thereto, said scanning information being utilised by the computer arrangement as guidance for the cross-cutting or a cross-cutting prognosis.

44. System according to claim 21, characterised in that the position determining device (5) on the harvesting machine comprises at least one position determining unit (27) on the vehicle of the harvesting machine and also means applied on the harvesting machine for determining the position of the harvesting arrangement in relation to the position determining unit.

45. System according to claim 44, characterised in that the means for determining the position of the harvesting arrangement in relation to the position determining unit comprises distance meters, angle determining means, direction indicators and/or videophotogrammetry equipment and/ or a further position determining unit (27').

46. System for forestry including timber harvesting by a harvesting machine (1) comprising a vehicle (2), a harvesting arrangement (3) mounted thereon and a computer arrangement (31) arranged on the harvesting machine, characterised in that a least one position determining device (5) is provided on the harvesting machine and capable of determining the position of the harvesting machine external, wirelessly receivable signals and that the computer arrangement (31) is adapted to determine and register the position of the harvesting arrangement (3) at the time of discharge from the harvesting arrangement of processed pieces of timber to provide position information, and that such position information is stored in a data base or on a data carrier to be used in subsequent fetching of the pieces of timber by a forwarder.

47. Method according to claim 2, characterized in that an evaluation of standing forest timber is accomplished before the harvesting concerning single trees or relatively small timbered surfaces within an area that is to be harvested or thinned by means of remote analyses, for example from aircrafts.

48. Method according to claim 4, characterized in that an evaluation of standing forest timber is accomplished before the harvesting concerning single trees or relatively small timbered surfaces within an area that is to be harvested or thinned by means of remote analyses, for example from aircrafts.

* * * * *